Oct. 9, 1928.
F. A. E. GOODROAD
1,686,691
SIGNALING APPARATUS FOR VEHICLES
Filed June 7, 1928  3 Sheets-Sheet 1
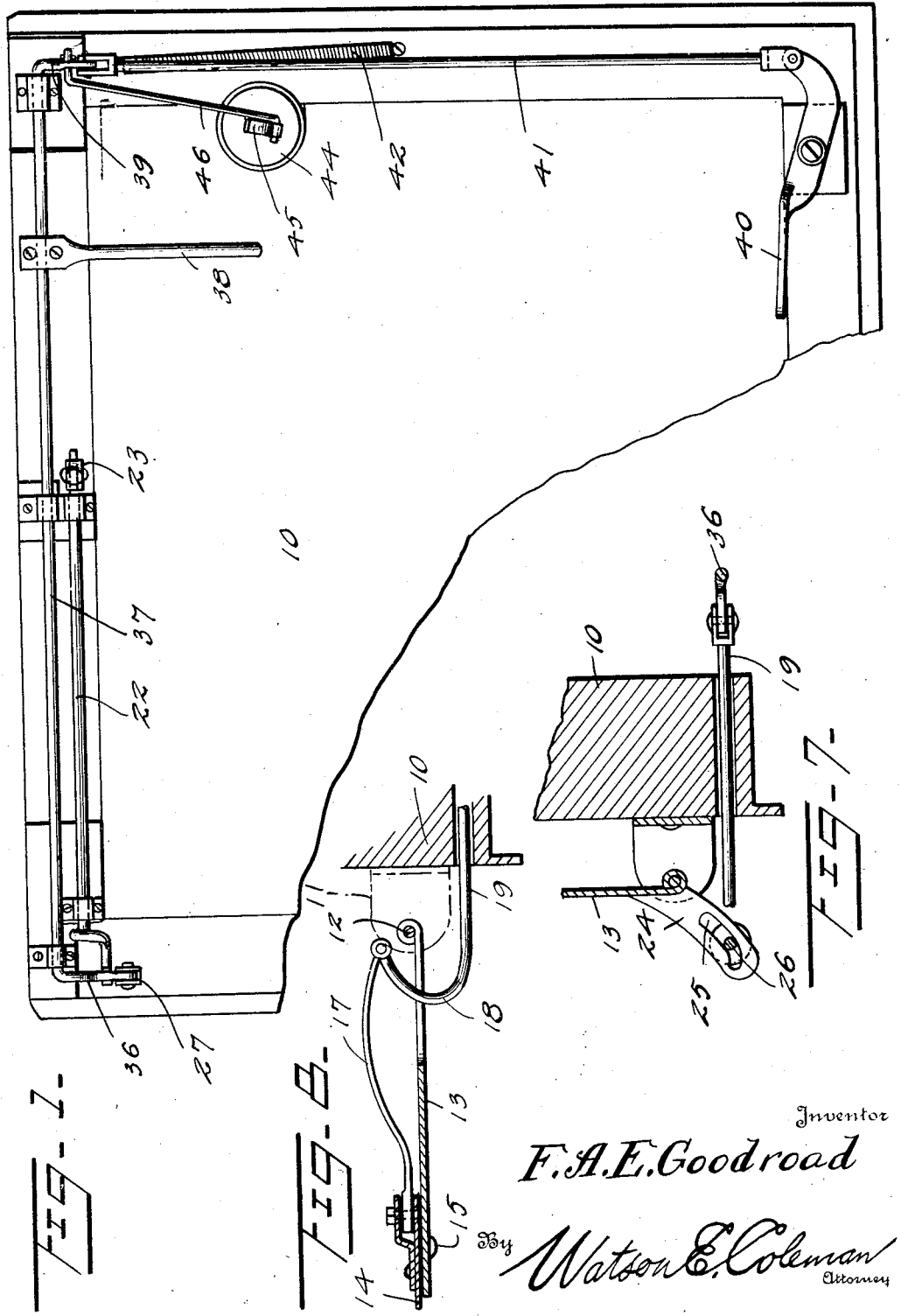

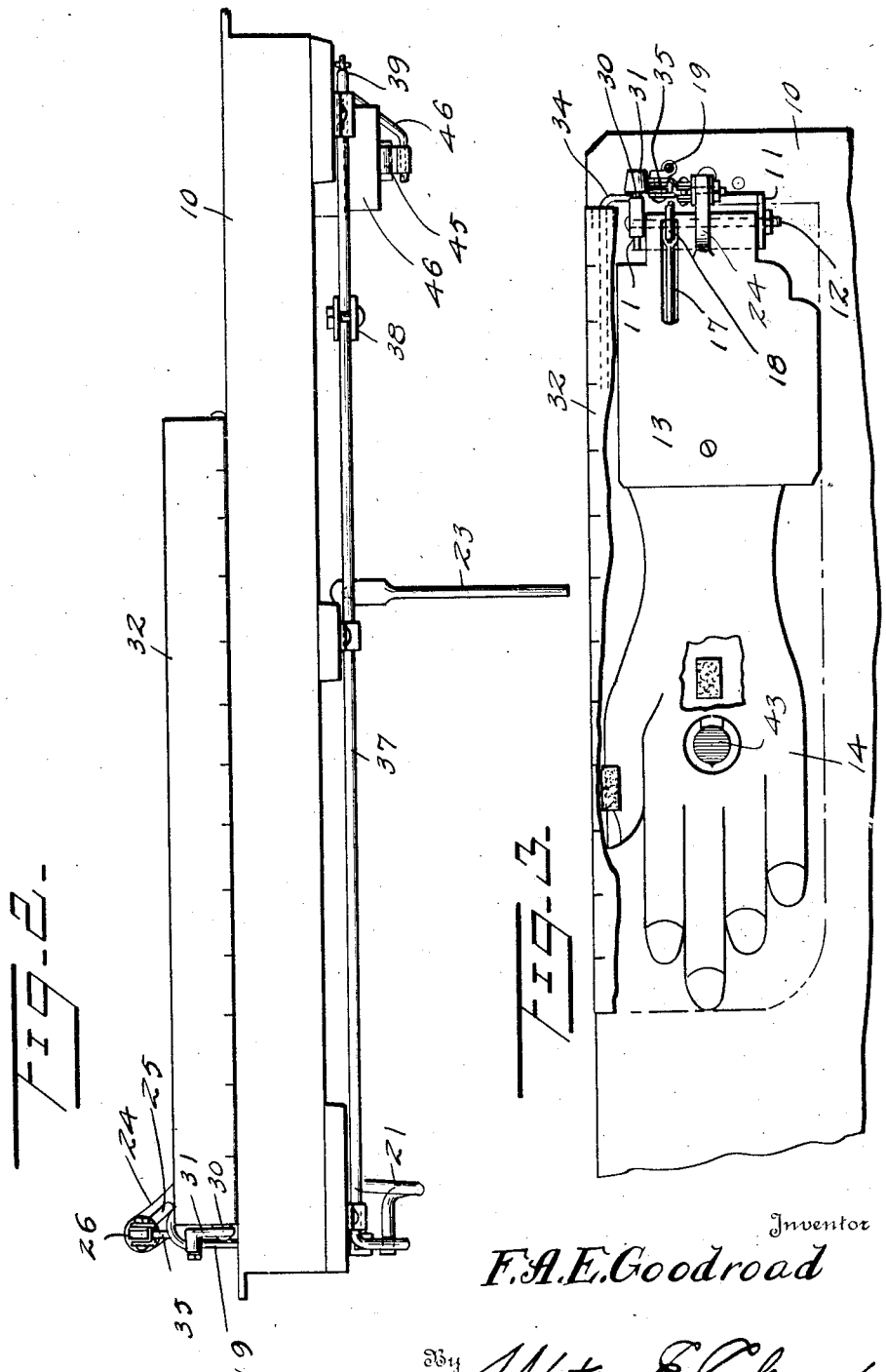

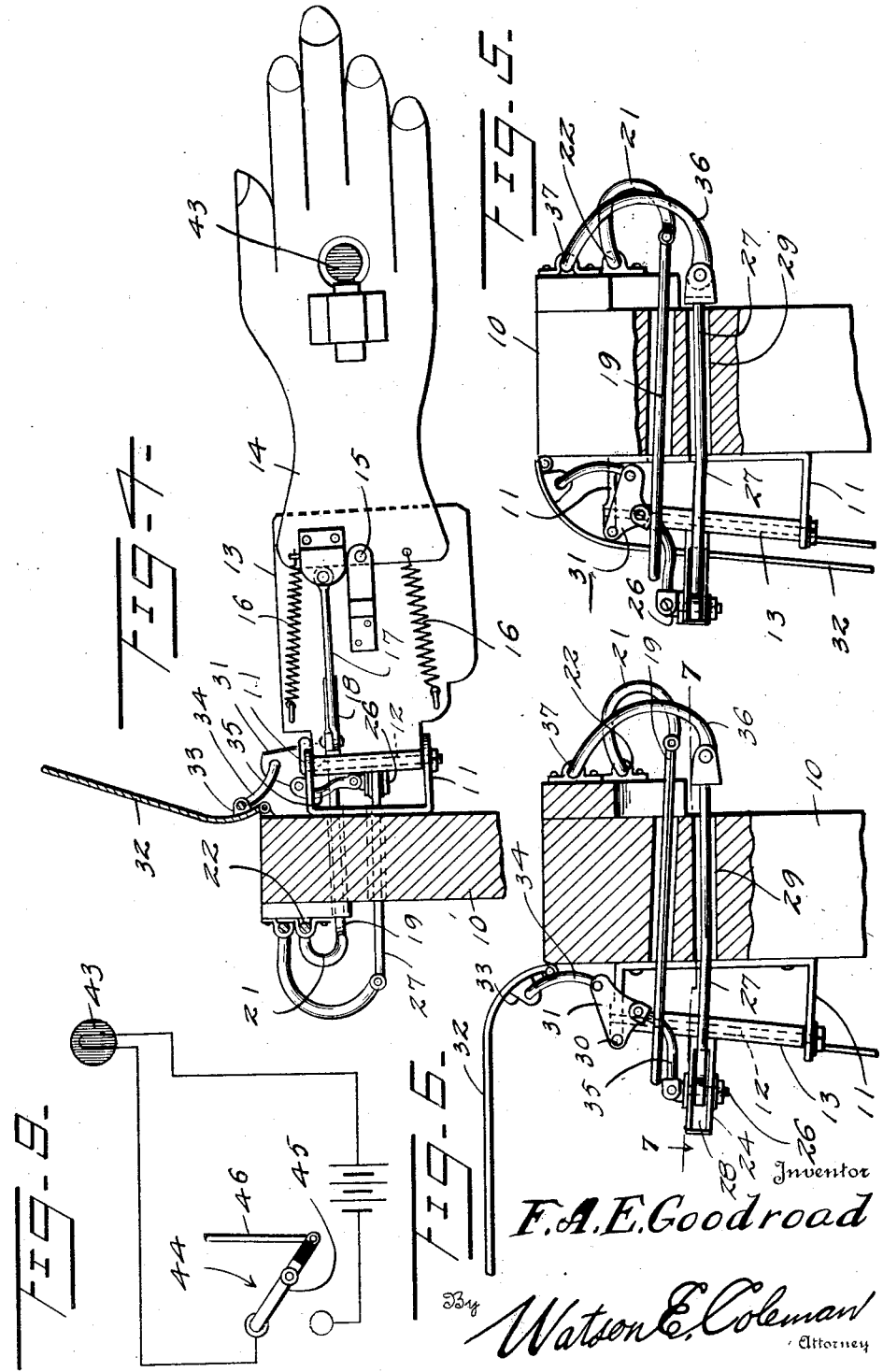

Patented Oct. 9, 1928.

1,686,691

UNITED STATES PATENT OFFICE.

FRANK A. E. GOODROAD, OF CANTON, SOUTH DAKOTA.

SIGNALING APPARATUS FOR VEHICLES.

Application filed June 7, 1928. Serial No. 283,625.

This invention relates to signaling apparatus for vehicles and more particularly to the construction of a semaphore type of signaling arm for use in this connection.

An important object of the invention is to provide a semaphore arm which may be arranged exteriorly of the vehicle and operated from the interior thereof, which is so constructed and arranged that it may simulate the action of the driver of a car in indicating his intention to stop or to turn.

A further object of the invention is to provide a device of this character which may be operated by the foot to indicate a stop, thus eliminating the necessity of the operator removing a hand from the steering wheel during what may be an emergency stopping operation.

A still further object of the invention is to provide a device of this character which, when in non-signaling position, is housed and protected from the elements by a movable housing which, as the signal is moved to operative position, shifts to permit free movement thereof.

A further object of the invention is to provide operating connections for the housing and signal arm from a single operating means of such character that when the signal is moved to operative position, the housing is moved to its open position before any movement of the signal takes place and the signal is then shifted and when the signal is returned to non-signaling position, the signal first moves to such position and then the housing shifts to its closed position.

These and other objects I attain by the construction shown in the accompanying drawings, wherein for the purpose of illustration is shown a preferred embodiment of my invention and wherein:—

Figure 1 is an inside elevation of a vehicle door having signal mechanism constructed in accordance with my invention;

Figure 2 is a plan view thereof;

Figure 3 is an outside elevation, the cover of the signal being broken away;

Figure 4 is a sectional view showing the inner face of the signal, the signal being in its signaling position;

Figure 5 is a detail elevation partially in section showing the operating connections for the signal, the parts being in the position which they occupy when the signal is in non-signaling position;

Figure 6 is a similar view with the parts shown in the intermediate position;

Figure 7 is a section on the line 7—7 of Figure 6;

Figure 8 is a detail sectional view showing the connections for oscillating the hand section of the signal arm;

Figure 9 is a diagrammatic view showing the connections for the signal.

Referring now more particularly to the drawings, the numeral 10 generally designates the door or wall of a car adjacent the driver's seat. For the purpose of description, this portion will hereinafter be referred to as the wall 10. In accordance with my invention, upon the exterior of this wall I provide vertically aligned bearings 11 receiving the ends of a shaft 12 upon which, between the bearings, is mounted a panel 13 constructed to resemble the outer end of the forearm.

To the outer end of the panel 13 is pivoted a hand section 14, the pivot 15 being horizontally disposed, so that this hand section may be vertically oscillated. Springs 16 connected to opposite sides of the inner end of the hand section and to the panel 13 normally maintain the hand section in a central position where it aligns with the panel 13. To the hand section 14 at its inner end and at one side of the pivot 15 is pivoted one end of a link 17, the opposite end of which is connected to the hooked outer end 18 of a second link 19. When the panel 13 and arm 14 are moved about their pivots so that they extend at substantially right angles to the wall 10, the link 19 which extends through this wall at 20 substantially parallels the link 17, so that longitudinal movement of the link 19 will result in longitudinal movement of the link 17 and the hand section 14 is oscillated about its pivot 15 against the action of the spring 16.

The inner end of the link 19 is connected to an arm or crank 21 upon a rock shaft 22, which shaft is provided at its end with a handle 23 which is pivoted to the shaft so that it may be shifted either to a point where it aligns with the shaft and accordingly lies closely against the inner face of the wall 10 or to a point where it extends outwardly from the shaft and may be employed to rock the shaft. To the inner end of the panel 13 at what is the outer face thereof when in non-signaling position is secured an arm 24, which arm has formed therethrough a vertical slot 25 angularly bent intermediate its ends, the inner end of the slot or end more nearly adjacent the panel 13 being in the form of a cove. The outer end of the slot, when the panel is in non-signaling position, extends substantially vertically to the wall 10. Shiftable in this slot is a cross head 26 which is secured to the outer end of a connecting rod 27 projecting through a slot 28 formed in the side wall of the arm 24 and through an opening 29 in the wall to the inner face of the wall.

In the normal or non-signaling position, this cross head is disposed at the outer end of the slot 25, with the result that if the connecting rod 27 is drawn inwardly at this time, initial movement of this rod will not result in any movement of the panel 13. After a predetermined movement, however, the cross head engages in the cove at the inner end of the slot 25 and from this time onward, inward movement of the connecting rod is accompanied by an oscillation of the panel until the panel finally arrives at a position perpendicular to the wall 10.

Supported from the wall and in the present instance directly supported from the upper bearing 11 is a pivot element 30 paralleling the wall 10. Upon this pivot element is mounted a lever 31 while to the outer face of the wall at a point above the lever, a housing or shield 32 is pivoted upon a horizontal pivot substantially paralleling the upper edge of the signal arm when in non-signaling position. This shield extends outwardly and then downwardly from its pivot and is of sufficient depth to completely cover the arm when closed thereover. The inner face of the shield is formed as a reflector and has secured thereto above the lever 31 an ear 33 which is connected to the end of the lever 31 by a link 34. Likewise connected to the lever 31 is a link 35 which is connected to the upper end of the cross head 26.

From an inspection of Figs. 5 and 6, it will be obvious that when this cover is in its lowered position and the signal arm is in non-signaling position, the initial portion of the stroke of the lever applies its force through the link 35 to cause the lever 31 to oscillate on its pivot and this oscillation is transmitted through the link 34 to the cover, causing the same to elevate.

As previously pointed out, this initial movement of the bar 27 merely causes the cross head to shift in the slot and exercises no effect on the signal arm so that this signal arm does not start to move until the cover reaches its raised position. When the cover reaches its raised position, the pivotal connections of the link 35 with the lever 31 and the cross head are substantially vertically aligned so that the final movement of the cross head does not effect any appreciable movement of the cover and this cover remains in its raised position. However, as previously pointed out, this final movement of the cross head causes the signal arm to oscillate from its non-signaling to its signaling position so that it is extended perpendicularly to the wall 10. The position assumed by the arm in response to movements of the cross head is that indicating a stop position. Intention to turn in either direction may be indicated by employing the rock shaft 22 and its connections to the hand section 14 to oscillate this hand section upon the panel 13 and raise or lower the same. The turning signal indicated by inclination of the hand section will be terminated immediately upon release of pressure applied to rotate the rock shaft by springs 16 or more particularly that spring which has been tensioned by the oscillation of the hand section. The signaling operation having been completed, the cross head is shifted outwardly and during its initial shifting movement, exercises no effect upon the cover, due to the approximate vertical alignment of the pivots of the link 35, but causes oscillation of the signal arm to the non-signaling position. The latter part of the movement of the cross head acts to shift the lever 31 through the link 35 and swing the cover downwardly to cover the signal arm.

Any suitable means may be employed for shifting the cross head. In the present instance, I have shown the inner end of the cross head rod 27 as connected to an arm 36 upon a shaft 37 having a handle 38 by means of which it may be rocked. This shaft is also provided with a second arm 39 which is link-connected to a foot lever 40 by a link 41. A spring 42 associated with this shaft and at present shown as connected to the link 41 and to the arm constantly urges the shaft to a position such that the cross head is at its outer position and the arm and its cover are in the non-signaling position. The hand section 14 may be provided with an electric signal lamp 43 and the movement of the shaft 37 employed to operate a switch 44 controlling the circuit of this lamp. For the purpose of illustration, I have shown this switch as an ordinary snap switch, the lever 45 of which is connected by a link 46 to the second arm 39 of the shaft 37. The foot lever 40 may be conveniently disposed so that it may be operated by the foot of the operator ordinarily employed to shift the clutch of the vehicle. This foot lever may lay closely against the wall 10 and the handle 38 of the shaft 37 may be so constructed that in non-signaling position, it lies closely against the face of the wall. With this disposition of these elements, the entire structure may be applied to a door of the vehicle without providing projecting mechanisms which will endanger the clothing or persons of occupants of the vehicle when they leave the same.

Since the construction employed is obviously capable of a certain range of change

I claim:—

1. In a semaphore signal, a pivoted semaphore, a pivoted cover therefor, an arm upon the semaphore having a slot, a longitudinally movable operating member for the semaphore having a portion engaged in said slot, said member extending in the general direction of the slot when the signal is in non-signaling position, a connection between said member and said cover whereby the cover is shifted during movement of the member in the slot and is inoperative during pivotal movements of the semaphore arm, the semaphore arm being formed in two sections and means operative when the arm is in signaling position for oscillating one of said sections with respect to the other thereof.

2. In a semaphore signal, a pivoted semaphore, a pivoted cover therefor, an arm upon the semaphore having a slot, a longitudinally movable operating member for the semaphore having a portion engaged in said slot, said member extending in the general direction of the slot when the signal is in non-signaling position, a connection between said member and said cover whereby the cover is shifted during movement of the member in the slot and is inoperative during pivotal movements of the semaphore arm, the semaphore arm being formed in two sections, means operative when the arm is in signaling position for oscillating one of said sections with respect to the other thereof, and spring means normally maintaining said sections in alignment.

3. In a semaphore signaling apparatus for vehicles, a horizontally swingable semaphore arm, a pivoted cover for the arm, a single operating means, connections between said cover and signal and the operating means whereby during movement of the operating means to move the signal from non-signaling to signaling position the cover is shifted before operation of the signal and during movement of the operating means to move the signal from signaling to non-signaling position the signal is moved to non-signaling position before movement of the cover, said semaphore arm being formed in two sections, and means operable when the semaphore arm is in signaling position for causing oscillation of one of said sections with respect to the other thereof.

4. In a semaphore signal for vehicles, a semaphore arm movable from signaling to non-signaling position, a shiftable cover for the arm when in non-signaling position, an operating member, a connection between the operating member and the semaphore arm whereby upon operation of the operating member to shift the semaphore arm to signaling position there is a primary movement of the operating member unattended by movement of the signal, connections between the operating member and the cover whereby the cover is shifted to clear the semaphore arm during such primary movement of the operating member, said semaphore arm being formed in two sections, and means operable when the semaphore arm is in signaling position for causing oscillation of one of said sections with respect to the other thereof.

5. In a semaphore signal, a pivoted semaphore, a pivoted cover therefor, an arm upon the semaphore being a slot, a longitudinally movable operating member for the semaphore having a portion engaged in said slot, said member extending in the general direction of the slot when the signal is in non-signaling position, a connection between said member and said cover whereby the cover is shifted during movement of the member in the slot and is inoperative during pivotal movements of the semaphore arm, said semaphore arm being formed in two sections, and means operable when the semaphore arm is in signaling position for causing oscillation of one of said sections with respect to the other thereof.

6. In a semaphore signal, a pivoted semaphore arm swingable about the pivot thereof from signaling to non-signaling position, said arm being formed in two pivotally connected sections, means for maintaining the sections normally in alignment with one another, means for shifting the arm from signaling to non-signaling position, and means operable only when the arm is in signaling position for oscillating one of said sections with respect to the other thereof.

7. In a semaphore signal, a pivoted semaphore arm swingable about the pivot thereof from signaling to non-signaling position, said arm being formed in two pivotally connected sections, means for maintaining the sections normally in alignment with one another, means for shifting the arm from signaling to non-signaling position, an operating member shiftable longitudinally of the arm when the arm is in signaling position, and a link connection between said member and the upper section of the arm engaging the arm at a point spaced transversely of the section from the pivot thereof.

In testimony whereof I hereunto affix my signature.

FRANK A. E. GOODROAD.